July 27, 1965  A. L. FREW  3,196,509
SAFETY SEAT BUCKLE FOR AIRCRAFT AND MOTOR VEHICLES
Filed Aug. 10, 1962  2 Sheets-Sheet 2
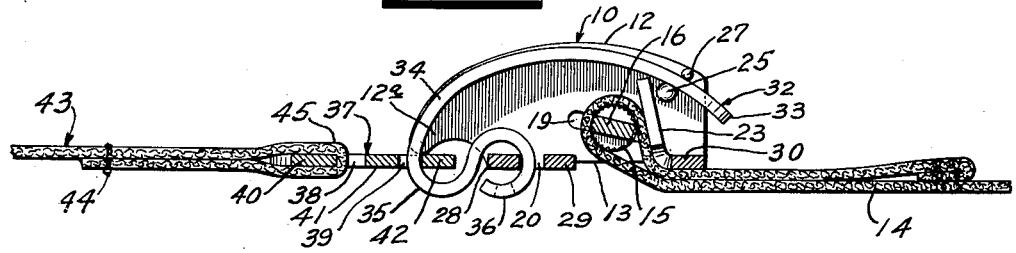
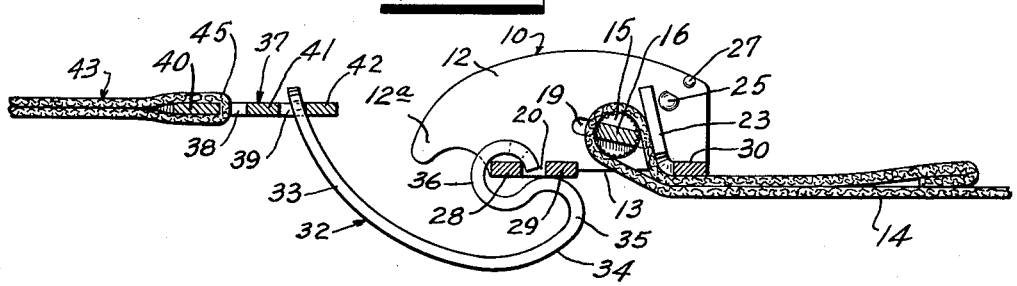
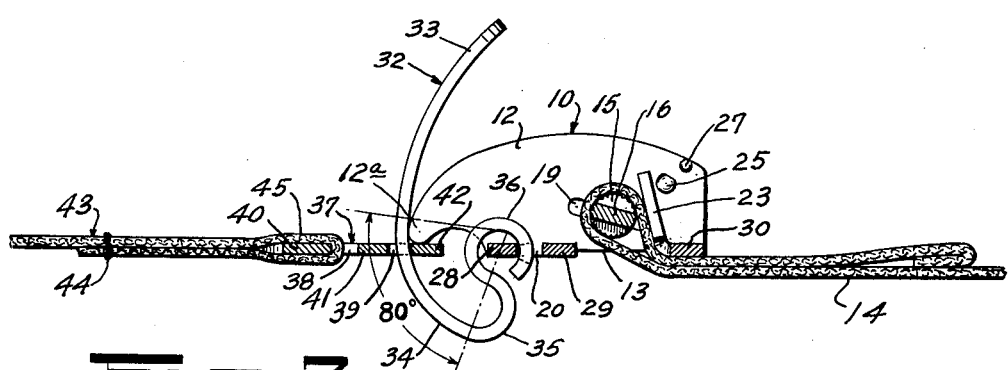
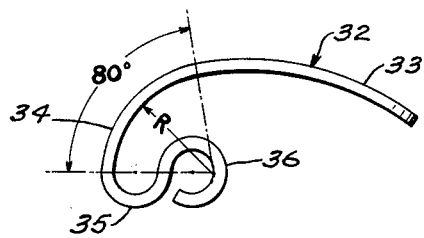
INVENTOR.
ALLAN L. FREW
BY
H. G. Manning
ATTORNEY ยง 3,196,509
Patented July 27, 1965

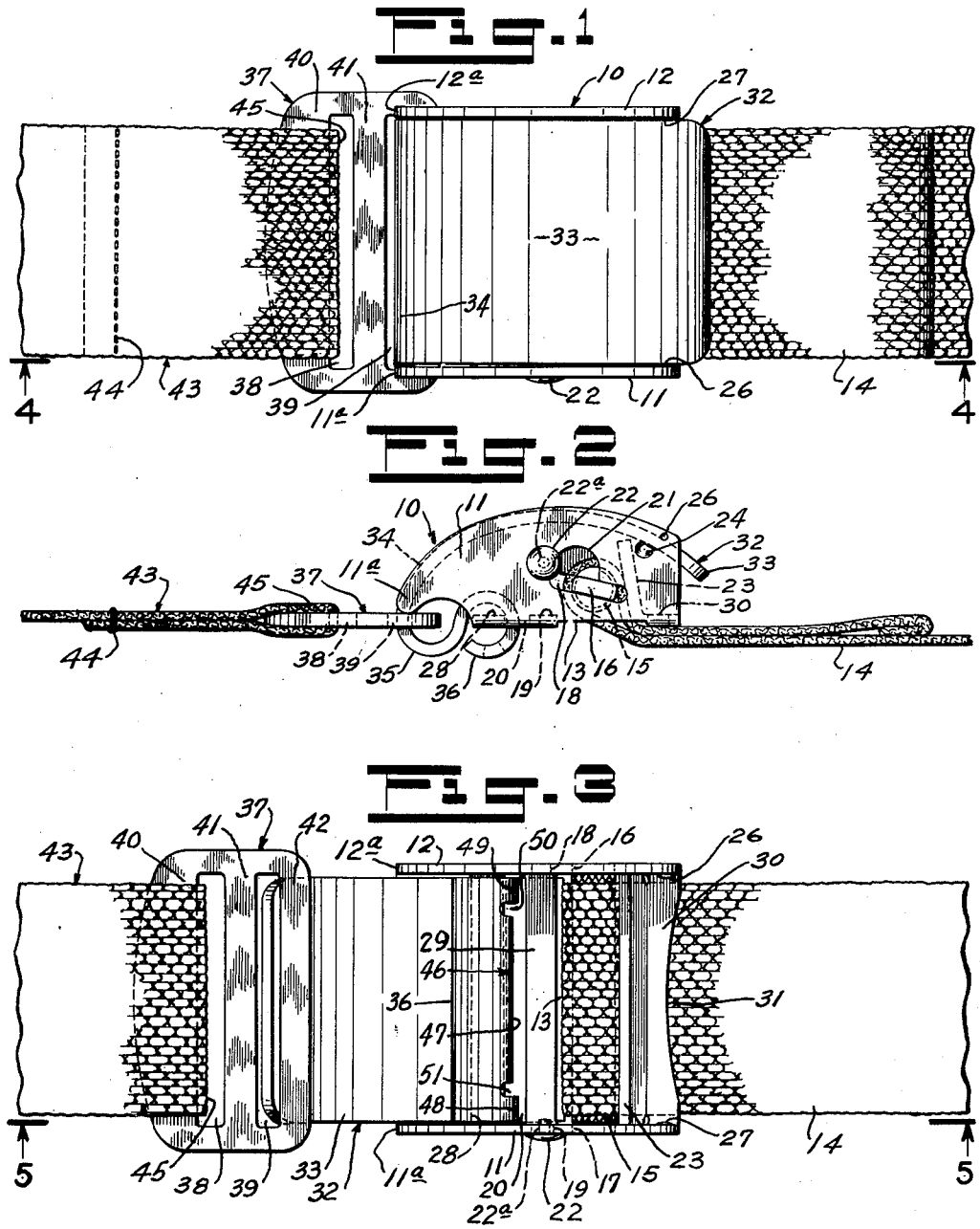

3,196,509
SAFETY SEAT BUCKLE FOR AIRCRAFT
AND MOTOR VEHICLES
Allan L. Frew, Woodbury, Conn., assignor to Waterbury
Buckle Company, Waterbury, Conn., a corporation of
Connecticut
Filed Aug. 10, 1962, Ser. No. 216,151
1 Claim. (Cl. 24—77)

This invention relates to safety belts and more particularly to a belt buckle for securing a passenger of an aircraft or motor vehicle in his seat in order to prevent injury by sudden decelerating movements of the vehicle.

One object of the present invention is to provide a safety seat belt buckle of the above nature, which may be secured to the vehicle by a pair of webbing straps.

A further object of the invention is to provide a safety seat belt buckle having a detachable lever of "pelican" hook shape which can be easily and positively closed with almost complete visibility, as well as audibility, thus eliminating engagement guesswork, and which can be opened with either hand, but cannot be accidentally opened by a short inadvertent stroke of the hand.

A further object of the invention is to provide a safety seat belt buckle of the above nature, in which the lever will be prevented from opening by a pair of nubbins on the sides of the buckle housing as well as by the strain on the belt.

A further object is to provide a safety seat belt buckle of the above nature, which will be simple in construction, which may be made of all metal parts, which will be inexpensive to manufacture, easy to install and manipulate, compact, having no springs which are subject to breakage and which might cause injury to the wearer's fingers when the belt lever is being closed or adjusted, which frequently occurs with the so-called "mouse trap" type of seat buckles, which will be ornamental in appearance, and very efficient and durable in use.

With these and other objects in view, there has been illustrated on the accompanying drawings one form in which the invention may conveniently be embodied in practice.

In the drawings:

FIG. 1 represents a top plan view of the improved safety seat belt buckle and the webbing straps to which it is attached, with the buckle lever shown in closed latched position.

FIG. 2 is a side view of the same.

FIG. 3 is a top plan view of the same, with the tongue of the buckle lever shown partly inserted through the eye slide prior to being swung to closed position.

FIG. 4 is a side sectional view of the same, taken along the line 4—4 of FIG. 1, looking in the direction of the arrows.

FIG. 5 is a side sectional view, taken along the line 5—5 of FIG. 3.

FIG. 6 is a side sectional view of the safety belt buckle, the eye slide, and the belt webbing straps, with the buckle lever shown in an intermediate position.

FIG. 7 is a side view of the pelican-shaped buckle lever shown by itself, and indicating the angular relationship between the curved sections thereof.

Referring now to the drawings, in which like reference numerals denote corresponding parts throughout the several views, the numeral 10 indicates a U-shaped body member or housing having a pair of integral resilient convex side walls 11 and 12 bent upwardly at right angles thereto. The side walls 11 and 12 have curved pointed forward ends 11a and 12a, which are adapted to conform to the convex shape of said side walls, as clearly shown in FIGS. 2, 4, 5, and 6.

The housing 10 is adapted to be adjustably secured to a webbing strap 14 which passes through a cross slot 13 in the base of said housing, as clearly shown in FIGS. 4, 5 and 6 of the drawing.

In order to permit the webbing strap 14 to be adjusted with respect to the housing 10, provision is made of a transverse knurled cylindrical roller 15 having flat reduced ends 16, 17 which are adapted to be loosely received in a pair of inclined slots 18 and 19 formed in the upstanding side walls 11, 12 of the housing 10.

The base of the housing 10 is also provided with a cross slot 20 for receiving an inner curled end hook 36 of a "pelican" shaped buckle lever 32, to be described later.

In order to permit the insertion of the knurled roller 15 into the housing 10 during the assembly of the buckle, provision is made in the upstanding side wall 11 of the housing 10 of a semicircular recess 21 communicating with the top of the inclined slot 18 in said side wall 11, and as clearly shown in FIG. 2 of the drawing, said recess is made slightly larger than the diameter of said roller 15.

After the knurled roller 15 has been assembled in position, it will be retained in the housing 10 by the head of a rivet 22 which passes through a rivet hole 22a in the side wall 11 of the housing 10, as clearly shown in FIGS. 2 and 3 of the drawing.

The housing webbing strap 14 is adapted to engage an inclined guide strip 23 integral with the housing 10, which abuts against a pair of flat sided stop lugs 24, 25 formed on the side walls 11 and 12 of said housing.

The resilient side walls 11 and 12 of the housing 10 are also provided on their inner edges with a pair of small round lever retaining knobs or nubbins 26, 27, which are adapted to be engaged by the tongue 33 of the pelican lever 32 to permit it to be swung into the closed position below said nubbins, as shown in FIG. 4, at which time said lever tongue 33 will engage the upper flat sides of the stop lugs 24, 25 located on the side walls of the housing 10.

The base of the housing 10 is provided with three parallel cross bars 28, 29, 30, the front edge of the cross bar 30 having a concave finger engaging recess 31 (FIG. 3).

The end tongue 33 of the pelican lever 32 is of relatively large radius, and is integral with an intermediate arcuate section 34 of smaller radius which extends through an angle of about 80° (FIGS. 6 and 7), and joins a semicircular arcuate section 35 of still smaller radius which terminates in the hook 36 which loosely embraces the rear cross bar 28. It will be noted that the two arcuate sections 35, 36 are arranged in a substantially S-shaped formation.

Provision is also made of a substantially rectangular flat eye slide 37 having a cross slot 38 for permanently receiving a non-adjustable webbing strap 43, said slide also having a cross-slot 39 for receiving the end tongue 33 of the pelican lever 32.

The eye slide 37 is provided with three cross bars 40, 41, 42, as clearly shown in FIG. 3 of the drawing. The end of the webbing strap 43 is secured to the remainder of said webbing strap as by stitches 44, providing an end loop 45, which embraces the cross bar 40 of the eye slide 37.

The pelican hook lever 32 is also provided with an intermediate transverse section 46 at the inner end thereof (FIG. 3), which section 46 has a central recess 47 located between a pair of rectangular curved lugs 48, 49 at the sides of said lever 32, said lugs being spaced from said intermediate section 46 by a pair of small pierced end recesses 50, 51.

It is important that the curvature of the section 34 of the pelican lever 32 be made concentric with the outer hook section 36 when said lever 32 is assembled. This is for the reason that if this particular section 34 is not a true arc of a circle, the buckle lever would either need a greater pull to open it than required by the government or SAE specifications in case of an arc of decreasing radius, or would be likely to open when the maximum loop load required by the Federal Specifications was applied thereto in the case of a curve with an increasing radius.

Operation

To assemble the buckle to the webbing straps 14, 43, the housing 10 will be held in one hand of the wearer, with the lever 32 in open position, and with the eye slide 37 held in his other hand. The tongue 33 of the lever 32 will then be inserted upwardly through the slot 39 of the eye slide 37, and swung as far as it will go, after which said tongue 33 will snap down beyond the nubbins 26, 27 of the resilient end walls 11, 12. The wearer will then adjust the webbing strap 14 to the most comfortable and safe position according to the size of his waist.

In case of an accident, at the moment of the greatest pressure on the safety belt assembly, it will be almost impossible with the present improved safety buckle for the wearer's arm to accidently flip open the lever 32, which is held by the nubbins of the resilient side walls 10, 11 of the housing 10.

One advantage of the improved seat belt buckle is that that it is extremely easy to adjust it to fit the wearer after it is closed. This is accomplished merely by pulling the free end of the webbing strap 14 to tighten the adjustment to the wearer's comfort. This adjustment can be made with one hand, as it is unnecessary to change the position of the knurled roller 15 to either tighten or loosen the belt assembly.

Another advantage of the present invention is that the two end lugs 48, 49 at the rear of the pelican lever 32 are of such short length that they may be bent around the cross bar 28 in the final assembly, after they have been hardened, using only a small force as compared to that which would otherwise be required to bend the full width of the hook 36 of the pelican lever 32 around said cross bar.

A further advantage of the improved safety buckle is that the eye slide 37 is wider than the buckle housing 10 and the lever 32, and hence is stronger than the narrow eye slides of previous buckles.

A further advantage is that the eye slide may be hooked to the pelican lever with either side up, and thus the engagement with the housing will be universal without the possibility of false security engagements.

While there has been disclosed in this specification one form in which the invention may be embodied, it is to be understood that this form is shown for the purpose of illustration only, and that the invention is not limited to the specific disclosure, but may be modified and embodied in various other equivalent forms without departing from its spirit. In short, the invention includes all the modifications and embodiments coming within the scope of the following claim.

Having thus fully described the invention what is claimed as new and for which it is desired to secure Letters Patent is:

In a safety seat belt for a vehicle, a pair of flexible webbing straps adapted to be secured to said vehicle, a rectangular flat eye slide permanently secured to one of said straps and having a cross slot, and a buckle adjustably secured to the other of said straps, said buckle comprising a U-shaped housing having a base and a pair of resilient upstanding side walls provided with inwardly extending nubbins at the upper edges thereof, said base having a rear crossbar, and a pelican-hook shaped lever having one end of relatively small radius hooked over said crossbar and having a curved tongue of larger radius for insertion through the cross slot of said eye slide, the end of said tongue being held down in closed position by said nubbins and the resiliency of said side walls permitting said nubbins to be spread apart when moving said tongue into or out of its closed position, said one end of said lever which is hooked over said crossbar including two transversely spaced lugs and an intermediate portion located between said two lugs, said one end in the transverse zone of said two lugs embracing said crossbar by an extent sufficient to prevent the disassembly of said lever from said crossbar and in the transverse zone of said intermediate portion embracing said crossbar by an extent less than enough to prevent the disassembly of said lever from said crossbar but sufficient to cause it to engage said crossbar when said lever is in its closed position, with the result that said lever may be nonremovably secured to said crossbar by bending only said lugs and without bending said intermediate portion.

References Cited by the Examiner

UNITED STATES PATENTS

| 1,512,833 | 10/24 | Eckart | 24—69 |
| 1,672,078 | 6/28 | Negler | 24—69 |
| 2,836,868 | 6/58 | Carter | 24—77 |
| 2,876,516 | 3/59 | Cummings | 24—75 |
| 2,964,815 | 12/60 | Sereno | 24—75 |

FOREIGN PATENTS 1,058,709  6/59  Germany.

DONLEY J. STOCKING, *Primary Examiner.*